April 29, 1952  J. D. ROBINSON  2,594,999
ANTIBACKFLOW VALVE
Filed March 22, 1950  2 SHEETS—SHEET 1

INVENTOR
JAMES D. ROBINSON
BY James H. Littlepage
ATTORNEY

INVENTOR
JAMES D. ROBINSON

Patented Apr. 29, 1952

2,594,999

UNITED STATES PATENT OFFICE 2,594,999

ANTIBACKFLOW VALVE

James D. Robinson, Memphis, Tenn.

Application March 22, 1950, Serial No. 151,288

3 Claims. (Cl. 251—118)

1

This invention relates to combined anti-siphon and anti-flow valves and, more particularly, to a valve for liquid distribution systems.

The object of the invention is to provide a valve for use in a system wherein a stream of water issuing from a source, such as a spigot, is ultimately directed through an injector mechanism which introduces a detergent or strong chemical into the stream. The invention is particularly directed to a valve to be disposed between the spigot and the injector so that water can pass through the valve only in the one direction. In accordance with this invention, back siphoning is prevented so that, should the pressure in the source line become negative, chemically treated water from the injector cannot be sucked back into the source line nor is it possible to suck back water, such as dishwater, which might possibly be in contact with the injector outlet.

It is intended by this invention not only to prevent siphon backflow of water through the valve, but also to prevent backflow if, by chance, excessive fluid pressures should build up on the side of the valve. It is intended thus to prevent introduction of chemicals or impurities into the source stream if, for instance, some failure occurred in the injector mechanism which, without the anti-backflow features of this valve, would cause water to be forced back by chemical under pressure from the injector to the source line.

Still another object of the invention is to provide for an anti-siphon, anti-backflow valve which can be easily assembled and disassembled, and assembled for inspection and cleaning. Yet again it is intended to provide a valve of the above type which will produce a sharp cutoff when the liquid supply stream is practically stopped, the object then being to break the siphon produced by the last portions of the liquid passing out the valve on any residual water standing in the inlet side of the valve. In this manner, dripping through the valve is avoided.

These and other objects will be apparent from the following specification and drawings in which.

Figure 1:
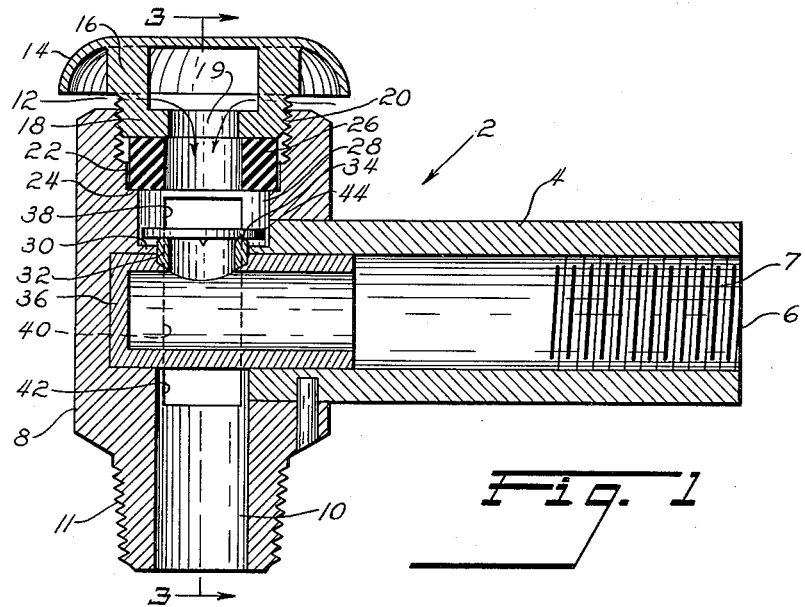
Fig. 1 is a vertical cross section taken longitudinally through the valve along the line 1—1 of Fig. 3 but showing the valve in restive, anti-siphon and anti-backflowing condition.
Figure 2:
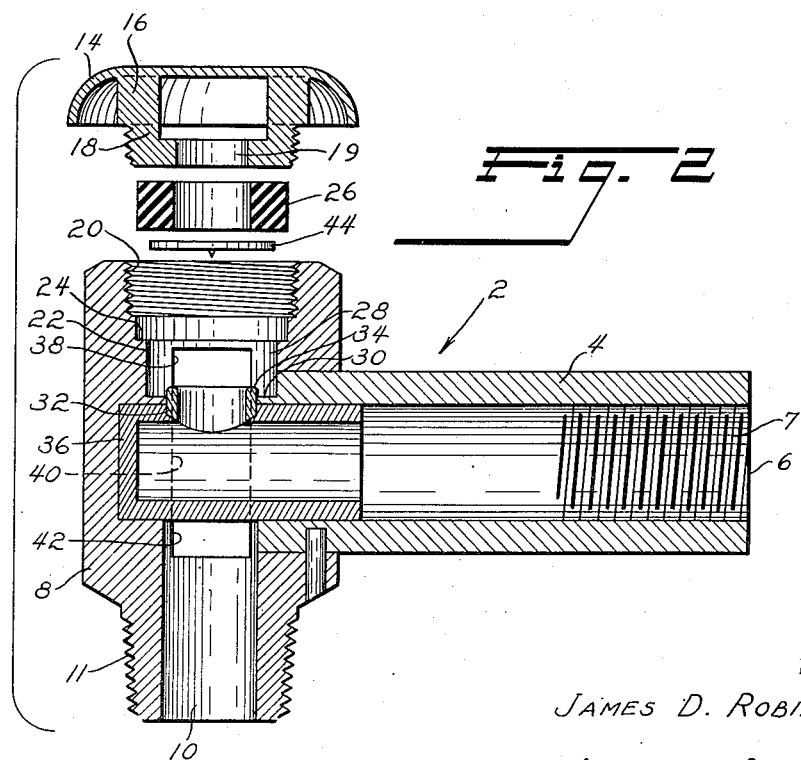
Fig. 2 is a view similar to Fig. 1 but showing the parts in exploded section; and, Fig. 3 is a transverse cross section taken vertically through the valve along the lines 2—2 of Fig. 1 but showing the valve in condition to permit flow of liquid therethrough in one direction and showing diagrammatically an injector mechanism connected therebelow.

Referring now to the drawings, the valve is embodied in a T-shaped casing 2, the stem 4 of which surrounds a liquid inlet passage 6 interiorly threaded at 7 for connection to a source of fluid, such as a water supply line. The head 8 of casing 2 has in its lower branch a liquid outlet passage 10 exteriorly threaded at 11 for connection, as with a chemical injector indicated diagrammatically at I, it being understood that a chemical such as chlorine or a detergent is introduced in relatively small but concentrated amounts into the stream of water issuing from outlet 10.

In the top branch of casing head 8 there is shown by arrow 12 an air inlet vent enshrouded by a vent canopy 14, integrally supported on spider 16 affixed on the exteriorly threaded base 18 which has a central opening 19 for the passage of air. Exteriorly threaded base 18 is removably engaged with internal threads 20 in the upper end of a cylindrical section 22, the lower part of which is preferably smooth as shown, with an inwardly extending annular shoulder 24 for receiving a disk seat washer 26 preferably of synthetic rubber or the like material well known for valve seats.

The moving element of the valve is mounted in annular chamber 28 having an apertured base 30. Apertured base 30 has affixed therein a cylindrical liner tube 32, the upper end of which constitutes a raised valve seat 34, and the lower end of which is fitted in a suitable aperture in a dead-end liner 36 so that water entering the valve through liquid inlet 6 passes into dead-end liner 36 and thence upwardly and exclusively through cylindrical liner 32 as shown by arrows 6A.

Attention is directed particularly to ports 38 on each side of chamber 28, which ports constitute the upper ends of by-passages 40 extending around each side of dead end liner 36 and terminate in outlet ports 38 at the upper end of the outlet passage 10 which is otherwise closed at its upper end by dead-end liner 36. The lower horizontal edges of port 38 lie just above the top of a valve disk 44, when the valve disk is in its lower restive position shown in Fig. 1. The upper edges of ports 38 lie just below the valve disk 44 when the latter is in its upper active position shown in Fig. 3.

In operation, when the water supply line is turned off so that no liquid enters inlet 6, valve disk 44 rests on raised seat 34. Outlet passage 10 is connected to the atmosphere via outlet ports 42, bypassages 39, ports 38, and air inlet vent 12. In this condition, the last water dropping from outlet passage 10 cannot siphon residual water standing in liquid inlet passage 6 because of the venting to the atmosphere by air inlet 12 of the chamber 28 on the upper side of valve disk 44. This, of course, provides a sharp cutoff as will be described further below. Back siphoning into a liquid supply line connected to inlet passage 6 is doubly prevented because reduced or negative pressure in liquid inlet passage 6 serves merely to suck valve disk 44 tightly down against raised seat 34, thereby sealing off liquid inlet passage 6 from the remainder of the valve. Additionally, chamber 28 is then vented to the atmosphere via air passage 12 so that any possible sucking back-leakage between valve disk 44 and raised seat 34 will serve only to draw through air from the top of the valve via vent 12 rather than the liquid from downwardly extending outlet 10.

Figure 3:
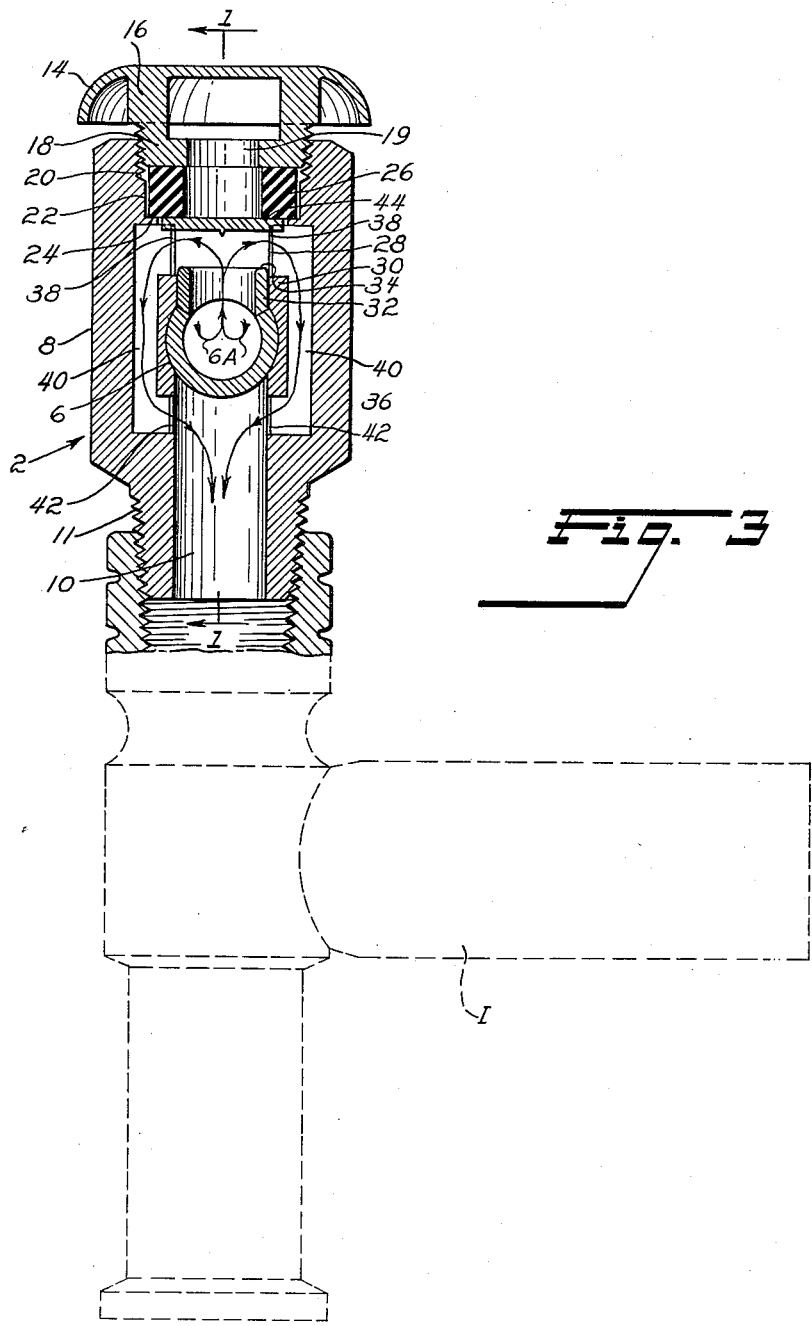

When water under normal top pressure enters the valve through inlet 6, upward pressure is exerted, as shown by arrows 6A on the lower side of the valve disk 44, thereby popping it up to the position shown in Fig. 3 where it rests against the lower side of disk seat washer 26, thereby sealing off air inlet passage 12, on the one hand, and establishing flow of water from inlet 6 to outlet 10 via chamber 28, ports 38, passages 40, and outlet ports 42. Finally, when the supply of water is cut off, valve disk 44 drops back to its raised seat 34 and the last slug of water passing through outlet 10 draws behind it air from vent 12 as described above.

In the above specification it will be understood that the valve is useful for controlling liquids other than water, and that that it is serviceable in systems other than those embodying chemical injectors. Likewise, the specific elements may partake of various substitute and equivalent forms, all within the scope of the following claims.

I claim:

1. An anti-siphon, anti-backflow valve for liquids comprising a substantially T-shaped casing with a hollow stem portion and two hollow branch portions projecting from the inner end of the stem portion, said stem portion constituting a liquid inlet and one of said branches constituting a liquid outlet, a portion of the other branch defining a valve chamber having cylindrical side walls, an inner end wall, and inlet passage means through said inner end wall connecting said one end of said chamber exclusively with said liquid inlet, a first valve seat in said chamber adjacent said inner end wall and surrounding said inlet passage means, said chamber having a vent in the opposite end thereof connecting with the atmosphere, a second valve seat disposed between said valve chamber and said vent, port means in the side wall of said chamber extending laterally therefrom and disposed between said inner end wall and said second valve seat, bypass passage means connecting said port means and said outlet, and a relatively thin valve disk movably supported in said chamber and alternately engageable with said first and second seats whereby selectively to seat against said second valve seat and to connect said inlet and said outlet via said port and passage means in response to sufficient liquid pressure in said inlet passage means to raise said valve disk and to seat against said first valve seat and to connect said outlet to the atmosphere via said passage and port means and vent when liquid pressure in said inlet passage means is substantially reduced, a major portion of said port means extending above the valve disc when it is seated on said first valve seat, whereby the fluid connection between said chamber and said liquid outlet is exclusively through said port means and said by-passage means.

2. An anti-siphon, anti-backflow valve for liquids comprising a substantially T-shaped hollow casing with a stem constituting a liquid inlet and two contiguous branches projecting from the inner end of the stem portion, one of said branches constituting a liquid outlet, a hollow liner in the inner end of said stem separating the same from the contiguous end of said outlet, said other branch having an inner side wall defining a valve chamber, a tube connecting one end of said chamber and the interior of said liner, a first valve seat at the chamber end of said tube, said inner side wall having port means therein, bypass means connecting said port means and said outlet, said other branch having therein a vent connecting the other end of said chamber to the atmosphere; a second valve seat at the chamber end of said vent, and a valve disk in said chamber selectively engageable with said seats, a major portion of said port means extending above the valve disc when it is seated on said first valve seat, whereby the fluid connection between said chamber and said liquid outlet is exclusively through said port means and said by-passage means.

3. The combination claimed in claim 2, said valve being adapted and arranged for operation with the stem of the T-shaped casing extending horizontally and with the head extending vertically and the outlet projecting downwardly, said bypass means extending around said liner.

JAMES D. ROBINSON.

REFERENCES CITED

The following references are of record in the file of this patent:

UNITED STATES PATENTS

| Number | Name | Date |
| --- | --- | --- |
| 1,742,319 | Porter | Jan. 7, 1930 |
| 1,855,106 | Gonyk | Apr. 19, 1932 |
| 2,159,691 | Fox | May 23, 1939 |
| 2,303,037 | Fredrickson | Nov. 24, 1942 |
| 2,325,956 | Holtman | Aug. 3, 1943 |